US007410420B2

(12) United States Patent
Shiraishi

(10) Patent No.: US 7,410,420 B2
(45) Date of Patent: Aug. 12, 2008

(54) GAME MACHINE WITH SELECTIVELY CONTROLLABLE MECHANICAL COVER

(75) Inventor: Kazutaka Shiraishi, Tokyo (JP)

(73) Assignee: Konami Gaming Incorporated, Las Vegas, NV (US)

( * ) Notice: Subject to any disclaimer, the term of this patent is extended or adjusted under 35 U.S.C. 154(b) by 749 days.

(21) Appl. No.: 10/801,330

(22) Filed: Mar. 15, 2004

(65) Prior Publication Data

US 2004/0209673 A1 Oct. 21, 2004

(30) Foreign Application Priority Data

Apr. 21, 2003 (JP) ............................ 2003-116220

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................ 463/21; 463/16; 463/20; 463/31

(58) Field of Classification Search .................. 463/16, 463/20, 21, 31
See application file for complete search history.

(56) References Cited

U.S. PATENT DOCUMENTS 3,642,287 A * 2/1972 Lally et al. .............. 273/143 R
4,826,169 A 5/1989 Bessho et al.
5,364,100 A 11/1994 Ludlow et al.
5,611,535 A * 3/1997 Tiberio .................. 273/143 R
5,720,662 A 2/1998 Holmes, Jr. et al.
5,943,672 A 8/1999 Yoshida
6,086,066 A 7/2000 Takeuchi et al.
6,190,254 B1 2/2001 Bennett
6,200,217 B1 3/2001 Osawa
6,241,607 B1 * 6/2001 Payne et al. .................. 463/20
6,261,178 B1 7/2001 Bennett
6,322,445 B1 11/2001 Miller
6,358,147 B1 3/2002 Jaffe et al.
6,517,432 B1 * 2/2003 Jaffe .......................... 463/16
6,672,960 B1 * 1/2004 B-Jensen ..................... 463/20
6,893,342 B1 * 5/2005 Singer et al. .................. 462/20
2002/0055382 A1 * 5/2002 Meyer ......................... 463/20
2003/0060266 A1 * 3/2003 Baerlocher ................... 463/20
2004/0023714 A1 * 2/2004 Asdale ........................ 463/22
2005/0130737 A1 * 6/2005 Englman et al. .............. 463/25
2006/0247002 A1 * 11/2006 Yoshimi et al. ............... 463/20
2007/0129134 A1 * 6/2007 Barrie ......................... 463/20

(Continued)

FOREIGN PATENT DOCUMENTS

DE 3105266 9/1982

(Continued)

*Primary Examiner*—Robert E Pezzuto
*Assistant Examiner*—Milap Shah
(74) *Attorney, Agent, or Firm*—Darby & Darby P.C.

(57) ABSTRACT

A game machine that displays symbols is provided. A display module of the game machine can display multiple types of symbols in multiple display regions when a game starts. An evaluation module evaluates whether or not a predetermined condition is met in a game. A display control module changes the number of symbols that can be displayed in the display regions when the condition is met. As a result, a game machine with symbols displayed in a unique manner is provided, and a game that provokes a player's curiosity can be implemented.

9 Claims, 11 Drawing Sheets

U.S. PATENT DOCUMENTS

2007/0232383 A1* 10/2007 Berman ....................... 463/20
2008/0070672 A1* 3/2008 Inamura ...................... 463/20

FOREIGN PATENT DOCUMENTS

DE 3105266 A1 * 9/1982
GB 2106292 A * 4/1983
JP 2001252397 A * 9/2001
WO WO-03010726 2/2003

* cited by examiner

GAME MACHINE WITH SELECTIVELY CONTROLLABLE MECHANICAL COVER

INCORPORATION BY REFERENCE

The present application claims priority under 35 U.S.C. §119 to Japanese Patent Application No. 2003-116220 filed on Apr. 21, 2003. The content of the application is incorporated herein by reference in its entirety.

BACKGROUND OF THE INVENTION

The present invention relates to a game machine equipped with a function for changing the number of symbols that can be displayed in a symbol display region.

Conventionally, in slot machines with video reels or physical reels, multiple types of symbols are changingly displayed in a display region for displaying symbols. Then, after a predetermined time has elapsed, symbols are statically displayed. Then, whether or not there was a win is evaluated based on whether a predetermined symbol combination is statically displayed on an activated win line or at predetermined positions. If a specific symbol combination is statically displayed on an activated win line or at predetermined positions, a payout is made to the player.

There are also slot machines in which wins involve the concept of ScatterPay, WindowPay, and AutoNudge.

Also, there are conventional slot machines in which a cover is disposed over the reels. This cover can be opened and closed. When a predetermined condition is met, the cover can close so that a section of the reels is covered or a covered symbol can be exposed. This opening and closing of the cover is accompanied by increases and decreases in the odds of winning.

However, with conventional slot machines, the sizes of the symbol display regions are uniform. Thus, restrictions are imposed on how wins are evaluated and symbols are displayed, and the game must be conducted within these restrictions. It is believed that eliminating these restrictions and developing a new method for displaying symbols not previously available will make it possible to provide a game that has novel playability and that is attractive to players.

The above, and other objects, features and advantages of the present invention will become apparent from the following description read in conjunction with the accompanying drawings, in which like reference numerals designate the same elements.

SUMMARY OF THE INVENTION

The object of the present invention is to overcome these problems and to provide a game machine that allows the number of symbols that can be displayed in symbol display regions to be changed.

A game machine according to the present invention includes: a display module capable of displaying a plurality of types of symbols in a plurality of display regions when a game starts; an evaluation module evaluating whether or not a predetermined condition is met in a game; and a display control module changing a number of symbols capable of being displayed in at least one of the display regions.

Since the number of symbols that can be displayed in the display regions changes when the above condition is met, symbols can be displayed in a manner not possible with the conventional technology, thus making it possible to implement a new game that can provoke the player's curiosity. For example, in a 3×5 multi-line video slot machine that can display 15 symbols in a changing or static manner, if the above condition is met the number of displayed symbols increases from 15 to 25, i.e., symbols are displayed in a 5×5 region. As a result, the player can win more easily, and the player's anticipation is greatly increased. It would also be possible, for example, to reduce the number of displayed symbols when a condition is met.

According to another aspect, the game machine of the present invention further includes a selection module using a selection to determine, out of the plurality of types of symbols, a symbol to be displayed in at least one of the display regions. The display control module changes a number of symbols capable of being displayed in the display regions by treating the predetermined condition as being met when a determination is made, as a result of the selection, to display a predetermined special symbol in one of the display regions.

When, as a result of a selection, a predetermined special symbol is determined to be displayed in any of the display regions, the number of symbols that can be displayed in the display regions is changed. This allows the player to more easily perceive the change in the number of symbols capable of being displayed in the display regions. More specifically, when the special symbol is displayed, the number of symbols capable of being displayed in the display regions is changed so that the player's anticipation associated with the displaying of the special symbol is increased. As a result, a game that provokes the player's curiosity is provided.

According to another aspect, in a game machine according to the present invention, the display control module changes a number of symbols capable of being displayed in one, some or all of the display regions by treating the predetermined condition as being met when a determination is made, as a result of the selection, to display a predetermined special symbol in one of the display regions.

Since the number of symbols being displayed in one, some or all of the display regions changes when a special symbol is displayed in any of the display regions, wins can become easier or harder. This can draw the player into the game. For example, when the number of symbols capable of being displayed in part of the display regions is increased, the possibility of winning is increased. Thus, the player has a high degree of anticipation regarding the game results.

According to another aspect, a game machine according to the present invention further includes a selection module determining, based on a player's selection operation, a display region needed for a symbol count to be changed.

Since the player can freely select the display region needed to change the number of symbols, the game results can reflect the player's judgment. As a result, a game that has a high degree of player participation can be provided.

According to another aspect, in a game machine according to the present invention, the display control module expands or reduces an area of the display regions of the display module so that a number of symbols capable of being displayed in the display regions is changed.

As a result, the number of symbols capable of being displayed in the display regions can be changed with a simple method. For example, in the case of a video reel, the reel is rendered by executing a program, making it easy to change the area of the display regions. As a result, symbols can be displayed in a manner not available in the conventional technology, and a game can be provided that provokes the player's curiosity.

According to another aspect, a game machine according to the present invention further includes a cover covering the display regions and an opening and closing device that opens and closes the cover. A number of symbols capable of being displayed in the display regions is changed by opening and closing the cover using the opening and closing device.

By opening and closing the cover, the number of symbols capable of being displayed in the display regions changes. This allows the present invention to be implemented for slot machines with physical reels.

According to another aspect, in a game machine of the present invention, the game includes a normal game and a special game; and the display control module changes a number of symbols capable of being displayed in the display regions during the special game.

By changing the number of symbols that can be displayed in the display regions during a special game, the symbol count during special games changes and unique games can be provided. As a result, when there is a transition from a normal game to a special game, there is a high degree of anticipation on the part of the player regarding the game results.

According to another aspect, in a game machine of the present invention, the special game is a free game activated without a player having to perform a new operation to increase a bet count.

Since the special game is a free game, the player can enjoy the game without placing new bets.

According to another aspect, in a game machine of the present invention, the display control module increases a number of symbols capable of being displayed in the display regions by changing the number of symbols.

Since the number of symbols that can be displayed in the display regions increases, the possibility of winning increases. As a result, the player has a high degree of anticipation regarding the game results.

DETAILED DESCRIPTION OF THE INVENTION

Embodiment 1

In a game machine according to a first embodiment, there are, for normal games, a display region formed from top, middle, and bottom levels for each of five reels (a multi-line video slot machine with 3×5 reels). In normal games, wins are evaluated within the 3×5 display regions. If at least one "Dynamite Symbol" (symbol 80 in FIG. 4) serving as a Scatter Symbol is statically displayed somewhere in at least one of the display regions, a predetermined number of free games are played starting with the next game.

During this free game period, all of the display regions are expanded to five levels, i.e., a first level through a fifth level, for five reels (five display regions). Thus, wins are evaluated in a 5×5 reel area. The Scatter Symbol is a symbol that is active (wins) simply by being statically displayed on one of the reels regardless of win lines.

Figure 1:
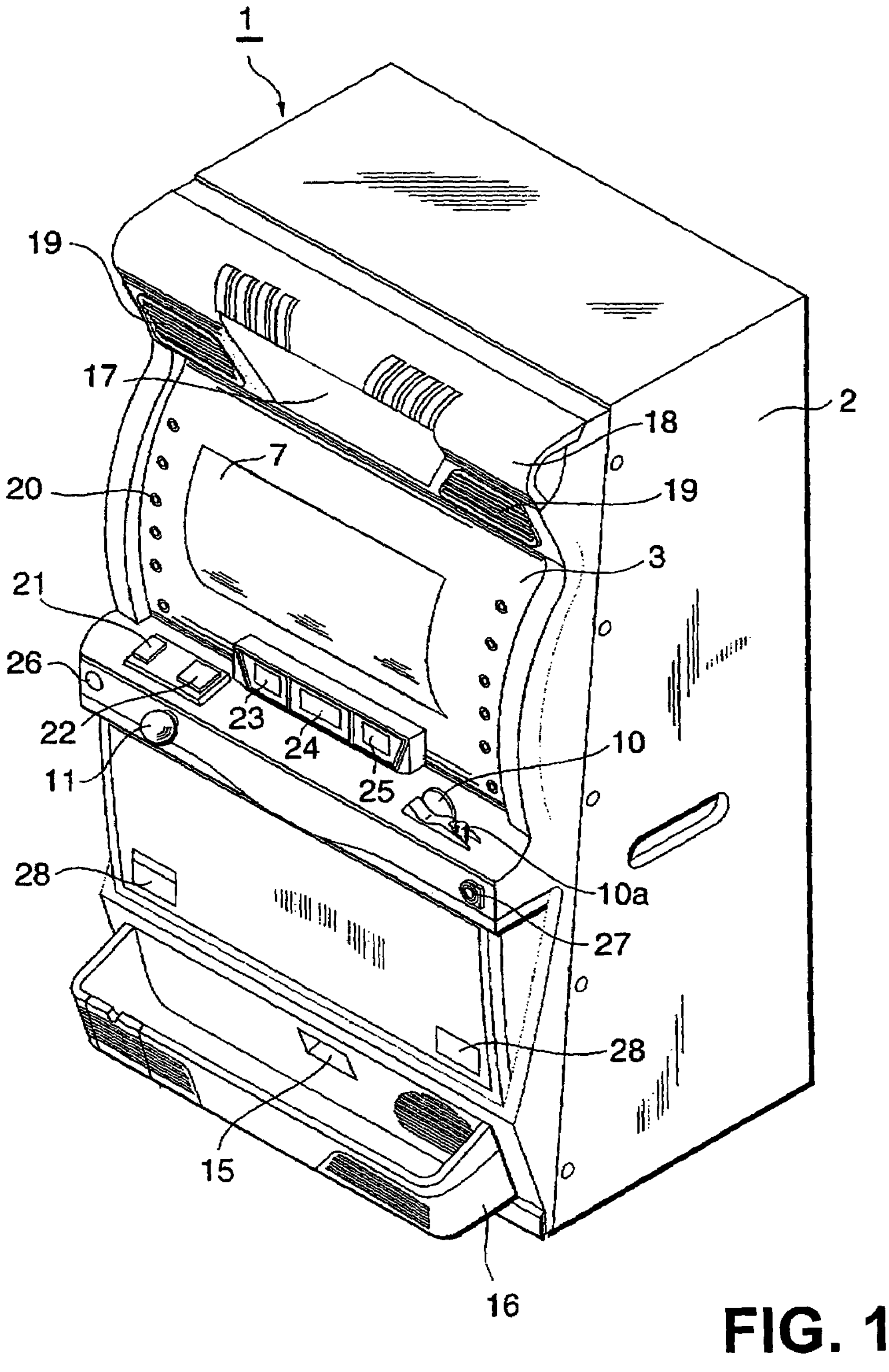
FIG. 1 is a drawing showing an exterior view of a game machine according to a first embodiment.
Figure 4:
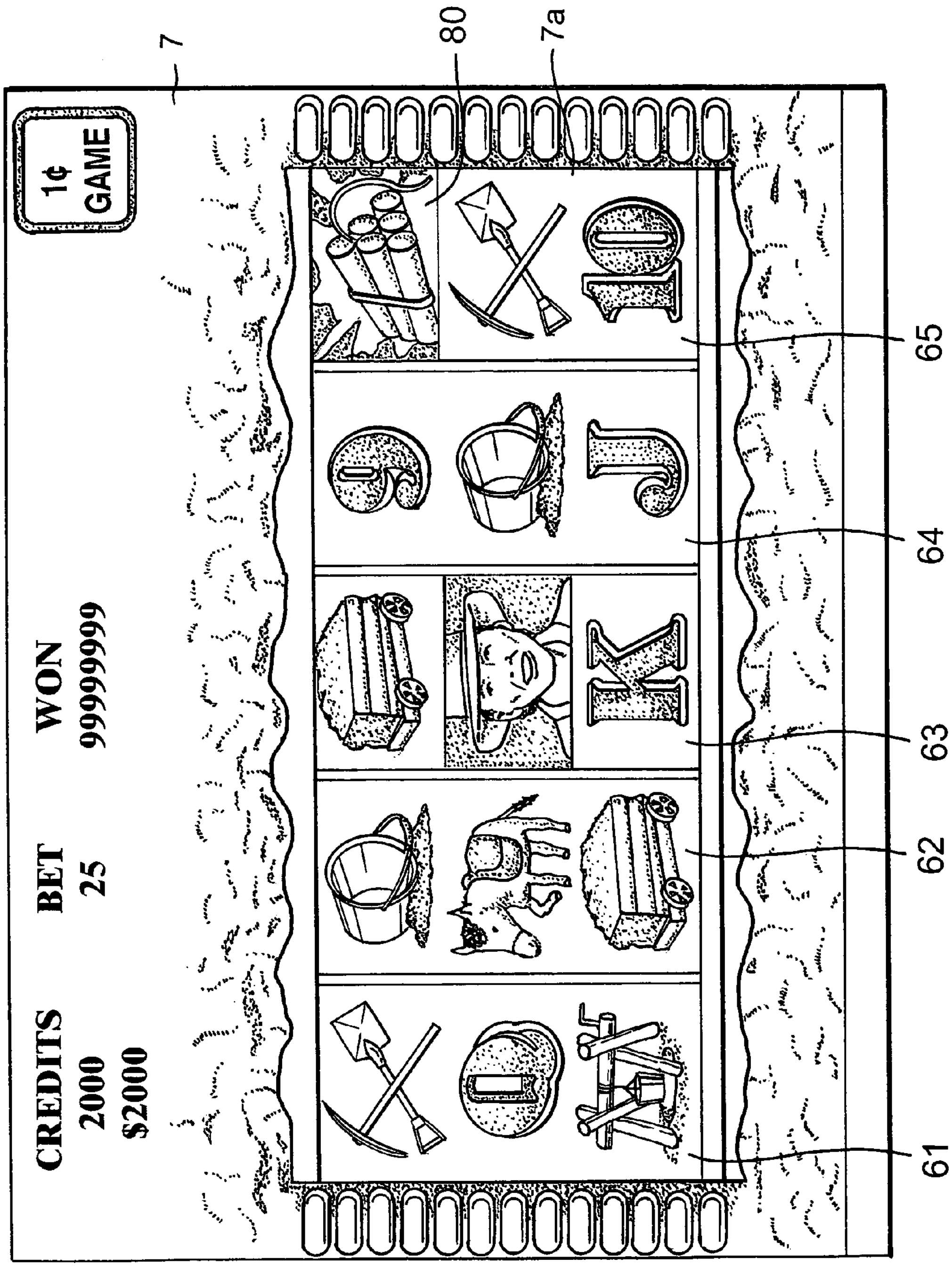
FIG. 4 is a drawing showing a sample screen of a game machine according to a first embodiment.

In FIG. 1, a game machine 1 is formed from a case 2 and a front panel 3 attached to the front of the case 2 so that it can be opened and closed. A liquid crystal panel or a CRT (Cathode-Ray Tube) is provided behind the front panel 3. As shown in FIG. 4, an image display section 7 displays symbols on five reels (61-65). The first embodiment uses video reels. A program is executed to display five reels in the image display section 7.

More specifically, the image display section 7 includes five reels (61-65) that display columns (vertically in terms of the game machine) of symbols that are displayed in a changing and static manner. Symbols can be displayed, reel by reel, in a changing or static manner. The image display section 7 displays multiple types of symbols in a changing manner in the column direction. The symbols displayed in a changing manner and statically displayed on the basis of results from internal selections.

On the front surface of the case 2 is disposed a medal deposit opening 10 and a medal return button 10*a*, which is used to get a medal back if the deposited medal becomes stuck or the like. A start lever 11 is a lever for starting the rotating display (changing display) of the reels 61-65 at the image display module 7.

In this game machine 1, a game begins when a player performs a BET operation to specify a valid win line. A win line is a line on which a win is established if a predetermined symbol combination appears on the line. This win line can be set up in multiple ways. A BET operation is performed either by depositing a medal in a medal deposit opening 10 or by placing a BET with a stored (credited) medal using a stored medal deposit button 21. A BET operation can also be performed by combining these BET operations.

As described above, a win can be determined not only by having a win line set up ahead of time at the start of a game but also by having a predetermined symbol statically displayed. For example, if at least one scatter symbol is statically displayed on any of the reels in the image display module 7, the player can win a bonus game in the form of a free game. If a win can, in this manner, be based on static display of a predetermined symbol regardless of the win line, a greater degree of freedom can be offered for win conditions compared to when a win line is set up in a fixed manner ahead of time. Furthermore, the player's anticipation is increased.

When a win line is identified by a BET operation by the player and the start lever 11 is operated, the image display module 7 shows a changing display of symbols. Then, once a predetermined time has elapsed, the image display module 7 switches, one by one, from a changing display to a static display for the reels 61-65. The stopping sequence can be, for example, sequentially from left to right as seen when facing the image display module 7. The stopping operations take place with 0.5 second intervals separating them. If, in this stopped state, a predetermined symbol combination is displayed on one of the win lines, a win corresponding to the symbol combination is obtained.

Below the front panel 3 are disposed a medal payout opening 15 and a medal receiving tray 16. Above the front panel 3 is a game effects display 17 used to provide game effects. The game effects display 17 can, for example, be an LCD (Liquid Crystal Display) or can be formed from various lamps. The first embodiment presents an example in which an LCD is used. Also, above the front panel 3 is disposed a bonus game display 18. The bonus game display 18 is formed from LEDs and displays wins of bonus prizes that provide high game value to the player, game wins, game effects, and errors. Speakers 19 generate voice instructions, music, sound effects, and the like. If a bonus prize is won, the game proceeds with conditions advantageous to the player, e.g., odds for wins are made higher than in regular games.

The lamps 20 disposed on the front panel 3 can light up, turn off, or blink to display wins, win lines activated according to the number of medals deposited (or the number of credits that were BET), and the like. A stored medal deposit button 21 is a button used a predetermined number of medals out of the medals stored (credited) in a medal storing device (not shown in the figure). A stored medal deposit button 22 is a button for using the maximum allowed number of medals out of the medals stored in the medal storing device. A stored medal count display module 23 displays the total number of medals stored in the medal storing device (total display). A win count display module 24 displays the number of remaining rounds and wins when a bonus prize is won. A medal payout count display module 25 displays the medal payout count and the like. The stored medals count display module 23, the win count display module 24, and the medal payout count display module 25 are formed, e.g., from LEDs. A settle-accounts button 26 is used to retrieve the stored medals. A locking device 27 locks or unlocks the door depending on the direction it is turned. A label 28 indicates the type and manufacturer of the game machine 1.

Figure 2:
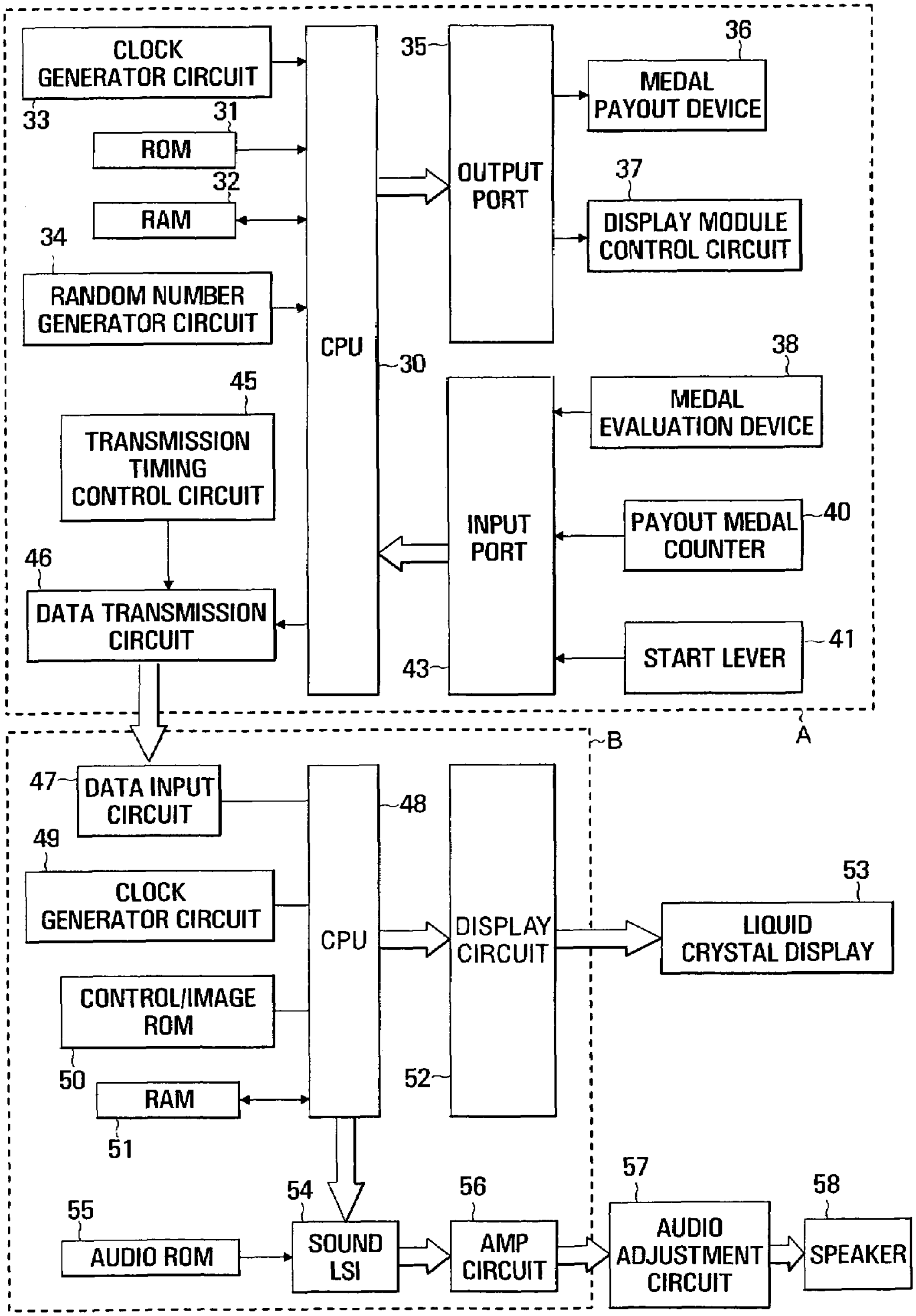
FIG. 2 is a drawing showing the electronic architecture of a game machine according to a first embodiment.

FIG. 2 shows the electronic architecture of a game machine according to the first embodiment. As shown in FIG. 2, the game machine 1 is formed electronically from a main substrate A and a sub-substrate B. In the main substrate A, a CPU 30 is equipped with a ROM 31 and a RAM 32 and performs control operations according to a program set up ahead of time. A ROM 31 stores a control program for controlling the operations of the game machine 1, a win selection table used to pre-select (internal selection) a prize, and the like. The CPU 30, the ROM 31, and the RAM 32 form an evaluation module.

The CPU 30 is connected to a clock generation circuit 33 generating a reference clock pulse and a random number generation circuit 34 generating a fixed random number. The CPU 30 and the random number generation circuit 34 form a selection module. Control signals from the CPU 30 are sent by way of an output port 35 to a medal payout device 36 paying out medals and a display module control circuit 37 controlling the image display module 7. The image display module 7 forms a display module and a display module control circuit 37 forms a display control module.

Also, the CPU 30 receives, by way of an input port 43, signals sent from a medal evaluation device 38 evaluating whether or not a medal is appropriate, a payout medal counter 40 counting payout medals, and a start lever initiating the spinning of the reels. The CPU 30, the ROM 31, the RAM 32, and the start lever 41 form the selection module.

The signals output by the CPU 30, which are controlled by a transmission timing control circuit 45 controlling the timing of signal transmission to the sub-substrate B, are sent to the sub-substrate B by way of a data transmission circuit 46.

At the sub-substrate B, signals from the data transmission circuit 46 are received by a data input circuit 47. The signals received by the data input circuit 47 are processed by the a CPU 48. The CPU 48 is connected to a clock generation circuit 49 generating a reference clock pulse, a ROM 50 storing various program and image data, and a RAM 51. Data associated with images is sent from the CPU 48 by way of the display circuit 52, which performs image processing and the like, to the liquid crystal display device 53. Text, static images, moving images, and the like are displayed on the liquid crystal display device 53. Also, data associated with audio is sent from the CPU 48 by way of a sound LSI 54, which performs audio processing and the like, to an amp circuit 56. The sound LSI 54 processes audio data and extracts necessary audio data from an audio ROM 55. The audio data, which receives amplification and the like from the amp circuit 56, is output from the speakers 58 by way of an audio adjustment circuit 57, which performs audio adjustments.

Figure 3:
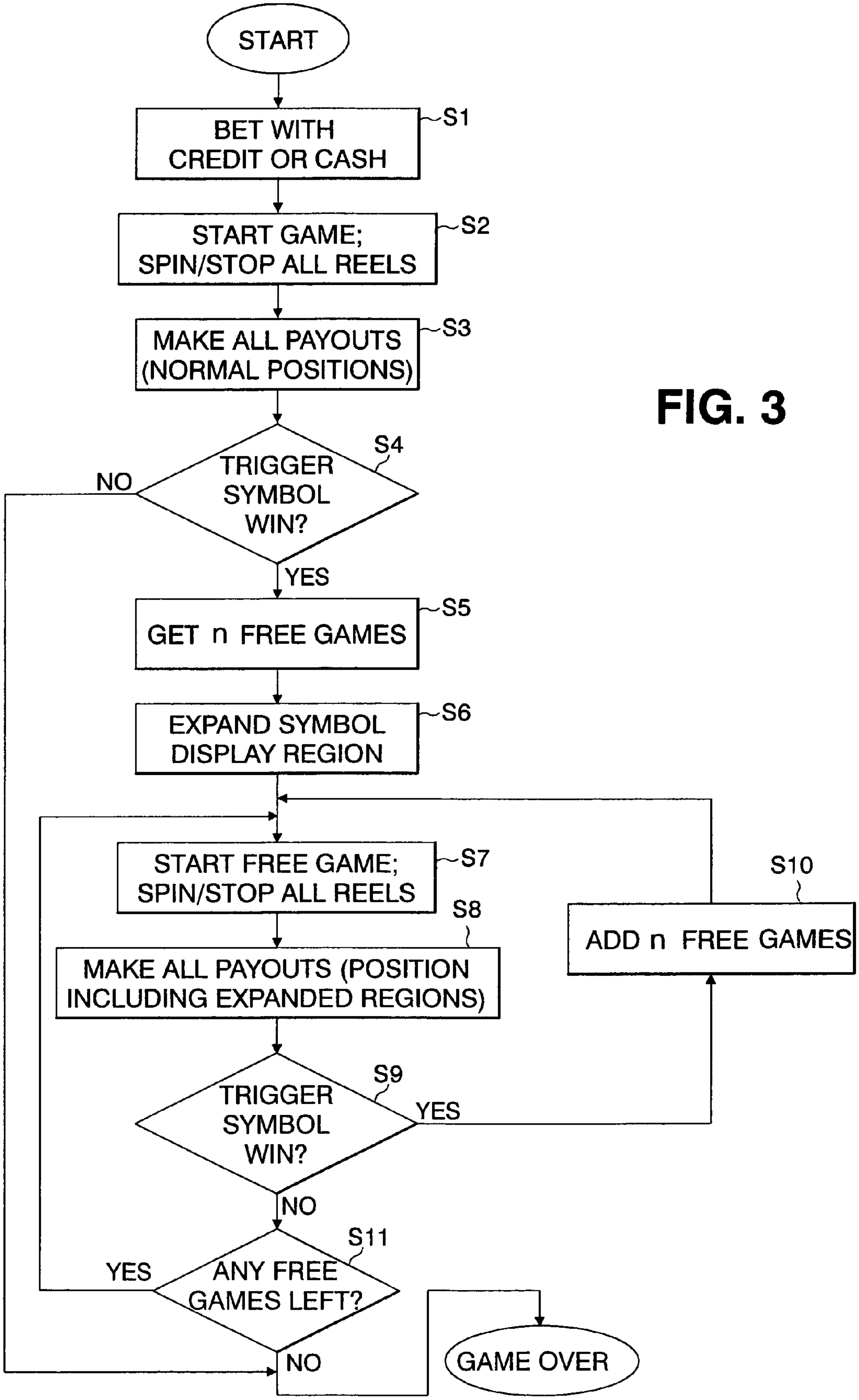
FIG. 3 is a flowchart showing the operations of a game machine according to a first embodiment and a fifth embodiment.
Figure 5:
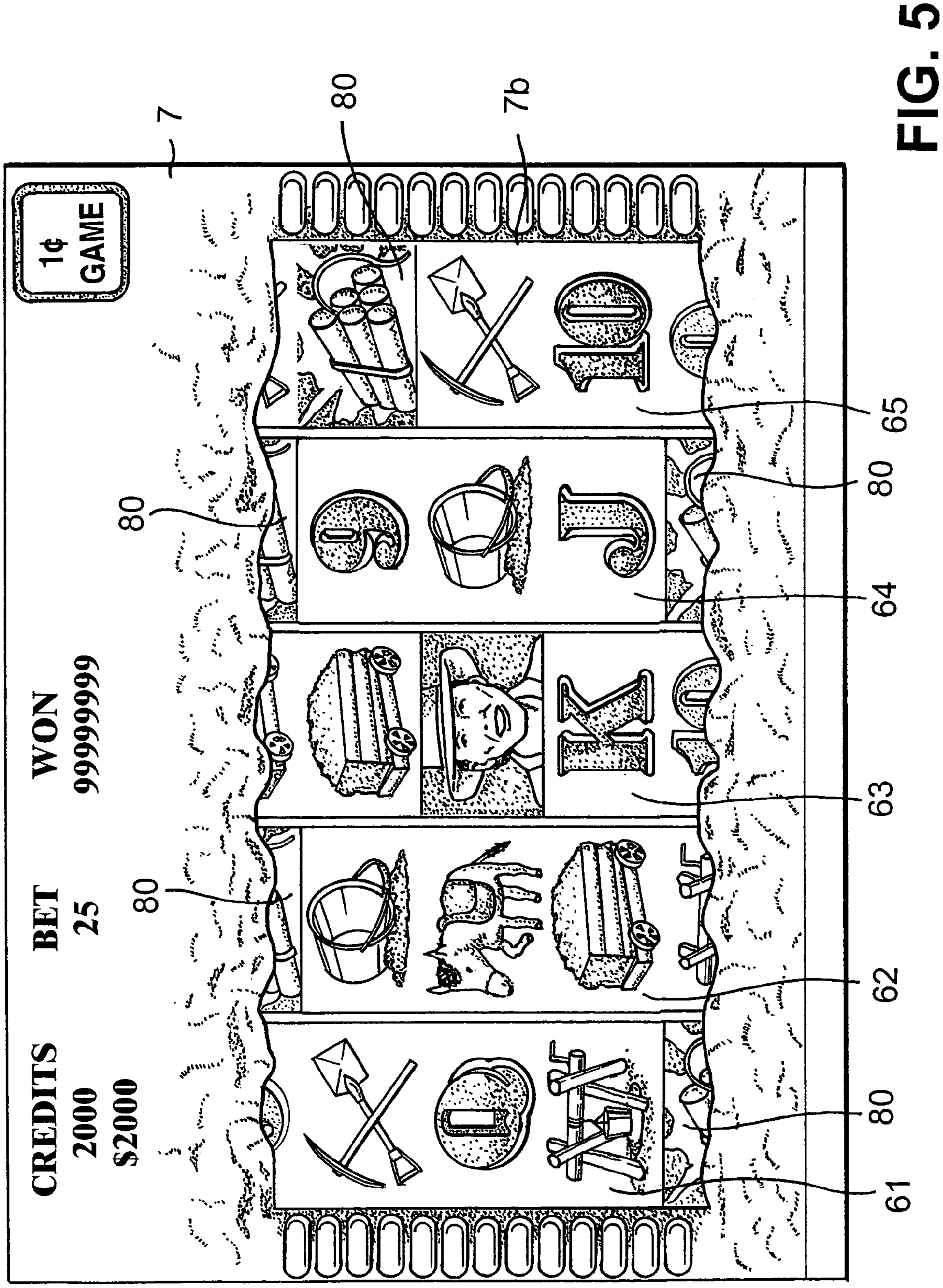
FIG. 5 is a drawing showing a sample screen of a game machine according to a first embodiment.
Figure 6:
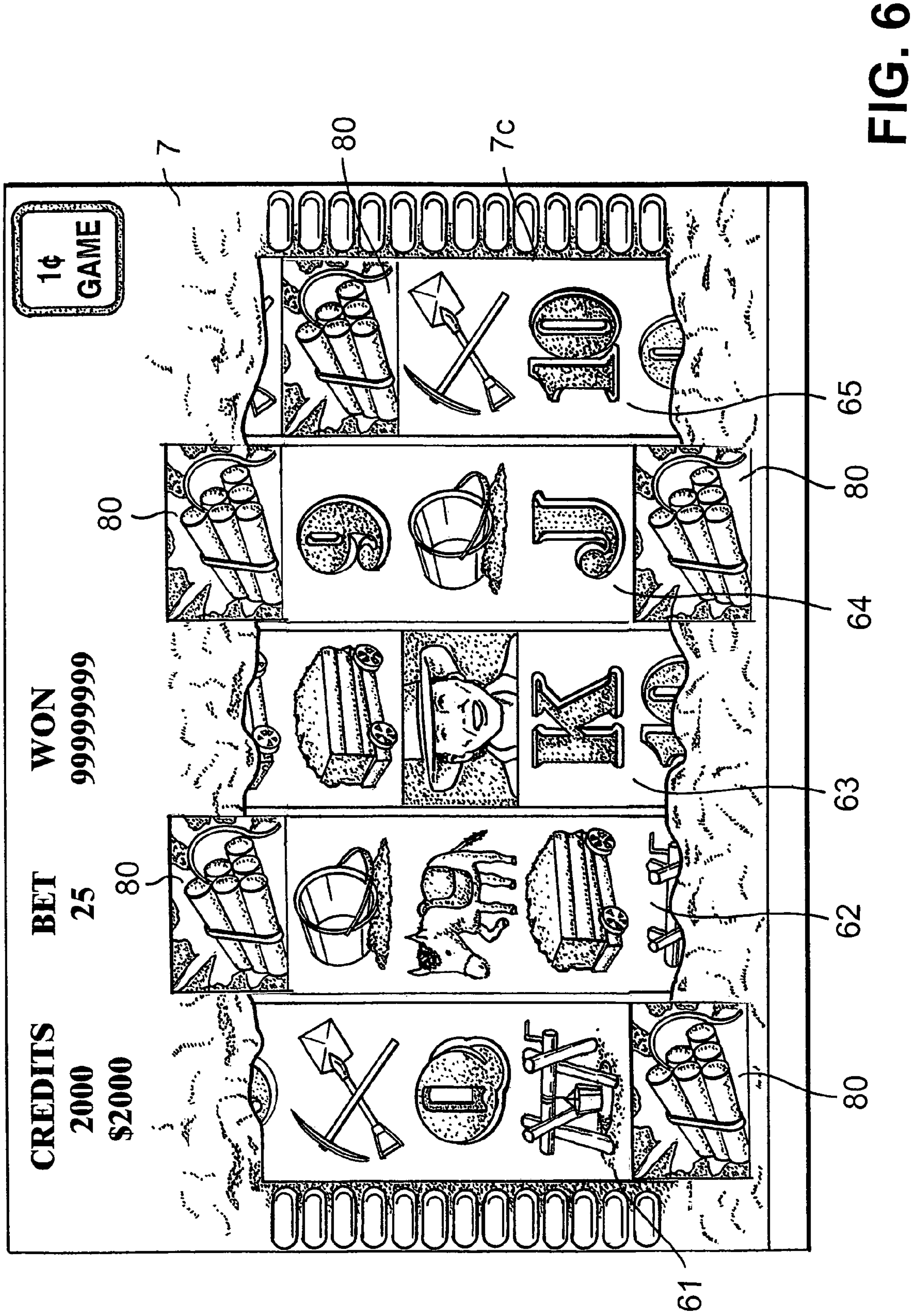
FIG. 6 is a drawing showing a sample screen of a game machine according to a first embodiment.

Next, the operations performed by a game machine according to the first embodiment as described above will be described, with references to FIG. 3 through FIG. 6. FIG. 3 is a flowchart illustrating the operations of a game machine according to the first embodiment. FIG. 4 through FIG. 6 are drawings showing sample image displays on the image display module 7. First, in a normal game standby state, an image as shown in FIG. 4 is displayed. More specifically, the five reels 61-65 are displayed in the symbol display regions 7*a* of the image display module 7. Also shown in the image display module 7 is a credit meter displaying a credit count, a BET meter displaying a BET count, and a WIN meter displaying the number of medals paid out to the player when there is a win. In the first embodiment, a free game is won if one or more "Dynamite symbol (symbol 80 in FIG. 4)", which serves as a scatter symbol, is displayed in any of the symbol display regions 7*a*.

In the flowchart shown in FIG. 3, the player performs a BET operation by depositing credit or cash (medals, coins, or cards can be used) (step S1), and a game is begun (step S2). When the game starts, each of the reels 61-65 spin from top to bottom in FIG. 4 and the symbols are displayed in a changing manner. Each of the reels 61-65 stop at a predetermined timing once a predetermined time has elapsed from the start of the spinning. If a win is established, a payout corresponding to the win is paid to the player (step S3). Up to this point, the symbol display regions 7*a* are a standard size, i.e., 3×5 reels.

Next, if a win is established at step S3, an evaluation is made to see if the win is due to a trigger symbol (the dynamite symbol) (step S4). If the win is not due to the trigger symbol, that game is ended. If, however, the win involves a dynamite symbol 80 serving as the trigger symbol being statically displayed, as shown in FIG. 4, the player obtains n free games (step S5). A free game is a game that is started without a BET from the player taking place.

If the player obtains n free games, the upper end and the lower end of the symbol display regions 7*a* move upward and downward respectively, as shown in FIG. 5. This expands the symbol display regions 7*a* and results in a larger symbol display regions 7*b* (step S6). As shown in FIG. 5, the region at the upper end and the region at the lower end of the symbol display regions 7*b* show partial symbols. As a result, wins are evaluated based on a 5×5 region. Also, since partial symbols appear in the region at the upper end and the region at the lower end of the symbol display regions 7*b*, the player can recognize the symbols stopped at the upper and lower end regions for the reels 61-65. Then, n (e.g., five) free games take place, starting with the next game.

When a free game is started (step S7), the reels 61-65 spin from the state shown in FIG. 5 and symbols are displayed in a changing manner. After a predetermined interval has elapsed, the reels 61-65 stop. If a predetermined symbol combination appears on a win line, the player wins, and a corresponding payout is paid to the player (step S8).

If, as shown in FIG. 5, dynamite symbols 80 are statically displayed in the lower-end region of the reel 61, the upper-end region of the reel 62, the upper-end region of the reel 64, and the region second from the top of the reel 65, there is a win based on the appearance of the scatter symbol. In this case, it would be possible to have the appropriate symbol display regions further extended to symbol display regions 7*c* so that the upper-end and lower-end regions where the dynamite symbols 80 appear can be seen in their entirety.

Next, an evaluation is made to see if a win based on a trigger symbol is established in a free game (step S9). For example, in the case shown in FIG. 6, a win based on a trigger symbol is established so n more free games are added (step S10) and control proceeds to step S7. If a win based on a trigger symbol is not established, an evaluation is made to determine if there are any remaining free games (step S11). If any free games remain, control proceeds to step S7. If there are no remaining free games, the free games are completed and the normal game standby state is restored.

With a game machine according to the first embodiment as described above, the number of symbols that can be displayed in the display regions changes when, as a result of internal selection, it is determined that a predetermined trigger symbol (dynamite symbol) is to be displayed in a display region. Thus, the player can easily perceive how the number of symbols that can be displayed in the display regions can change. More specifically, the number of symbols that can be displayed in the display regions changes when a trigger symbol (dynamite symbol) is statically displayed, so the player's anticipation is heightened. As a result, a game that can provoke the player's curiosity is provided.

Second Embodiment

In a second embodiment, the symbol display regions 7*a* are expanded to the symbol display regions 7*b* when there is a MAXBET or MAX line play state. More specifically, when the player performs a BET operation and the maximum allowable BET count is used, or if the maximum allowable number of win lines are activated, the display regions expand to the symbol display regions 7*b*. Other aspects are the same as in the first embodiment.

Figure 7:
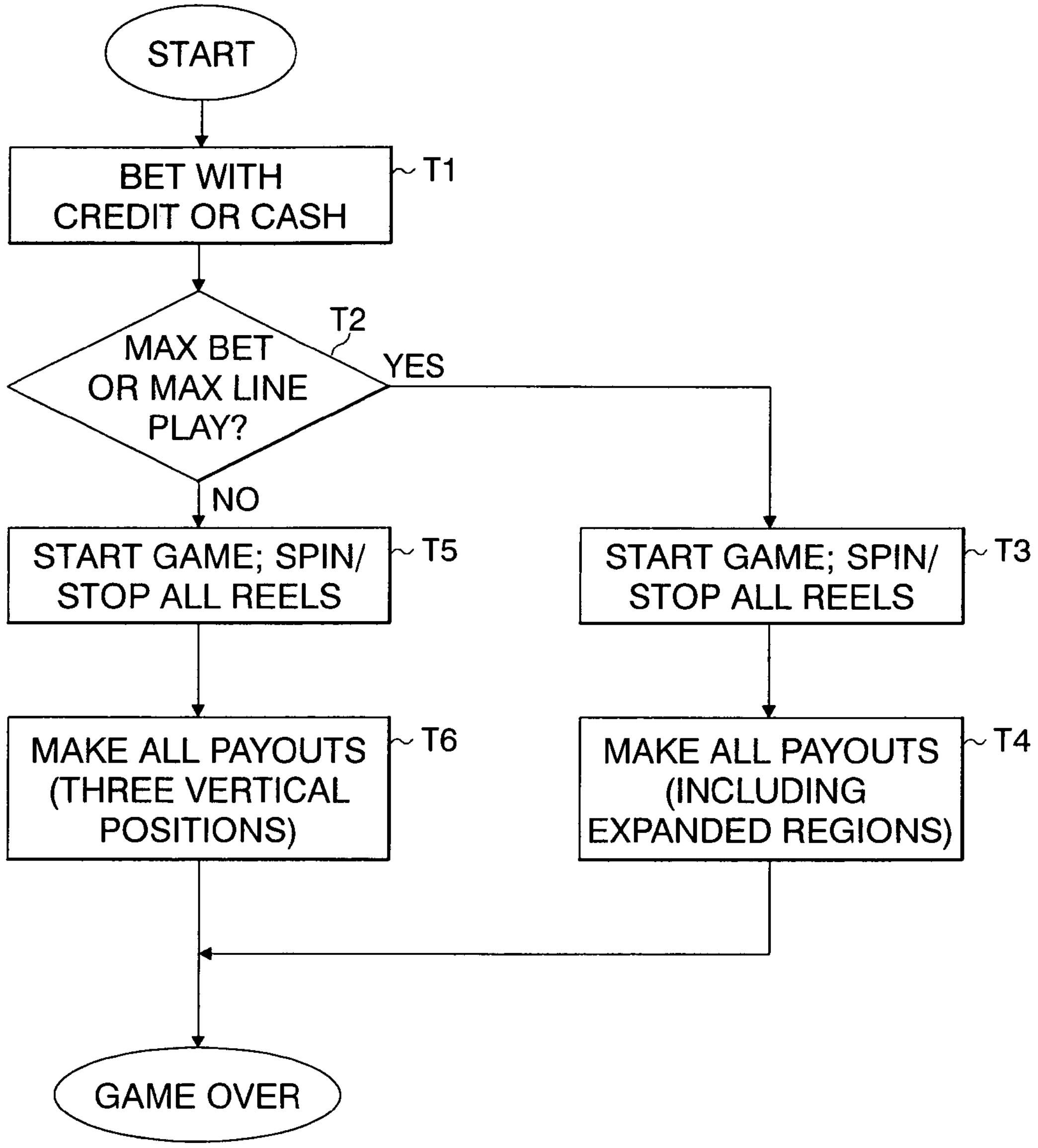
FIG. 7 is a flowchart showing the operations performed by a game machine according to a second embodiment.

FIG. 7 is a flowchart illustrating the operations performed by a game machine according to the second embodiment. In the normal game standby state, the display is as shown in FIG. 4. More specifically, each of the five reels 61-65 is displayed respectively in one of symbol display regions 7*a* of the image display module 7. Also displayed on the image display module 7 are a credit meter showing the number of credits, a BET meter showing the number of BETs, a WIN meter showing the number of medals to be paid out to the player for a win, and the like. In the flowchart shown in FIG. 7, the player performs a BET operation by depositing credit or cash (a medal, a coin, a card, or the like can be used) (step T1). The BET operation is checked to see if there is a MAXBET or a MAX line play (step T2). If there is a MAXBET or a MAX line play, the symbol display regions are expanded to what is shown in FIG. 5. Since the symbol display regions 7*b* are a 5×5 reel, the region to be evaluated becomes larger and chances of winning are better. Next, the game is begun and all the reels are spun and then stopped after predetermined intervals (step T3). If a win is established, a payout corresponding to the win is paid to the player (step T4).

At step T2, if there is no MAXBET or MAX line play, a game is started from a normal state with the symbol display regions 7*a*. All the reels are spun and then stopped after predetermined intervals (step T5). If a win is established, a payout corresponding to the win is paid to the player (step T6).

Since the symbol display regions are expanded when the player enables a MAXBET or a MAX line play, the player can enable a MAXBET or a MAX line play if he or she wants to increase the number of symbols to be displayed. Thus, the player can freely select to increase the number of displayed symbols. As a result, the game results can reflect the player's judgment, making it possible to provide a game with a high degree of participation for the player.

Third Embodiment

In a third embodiment, the player places an "extra bet" before a game so that the symbol display regions 7*a* expand to the symbol display regions 7*b*. More specifically, the symbol display regions expand when the player's BET operation involves placing a BET for expanding the symbol display regions in addition to a BET for playing the game. Since the player can win more easily by expanding the symbol display regions, the player is made to place an extra bet in return. Other aspects are the same as those from the first embodiment.

Figure 8:
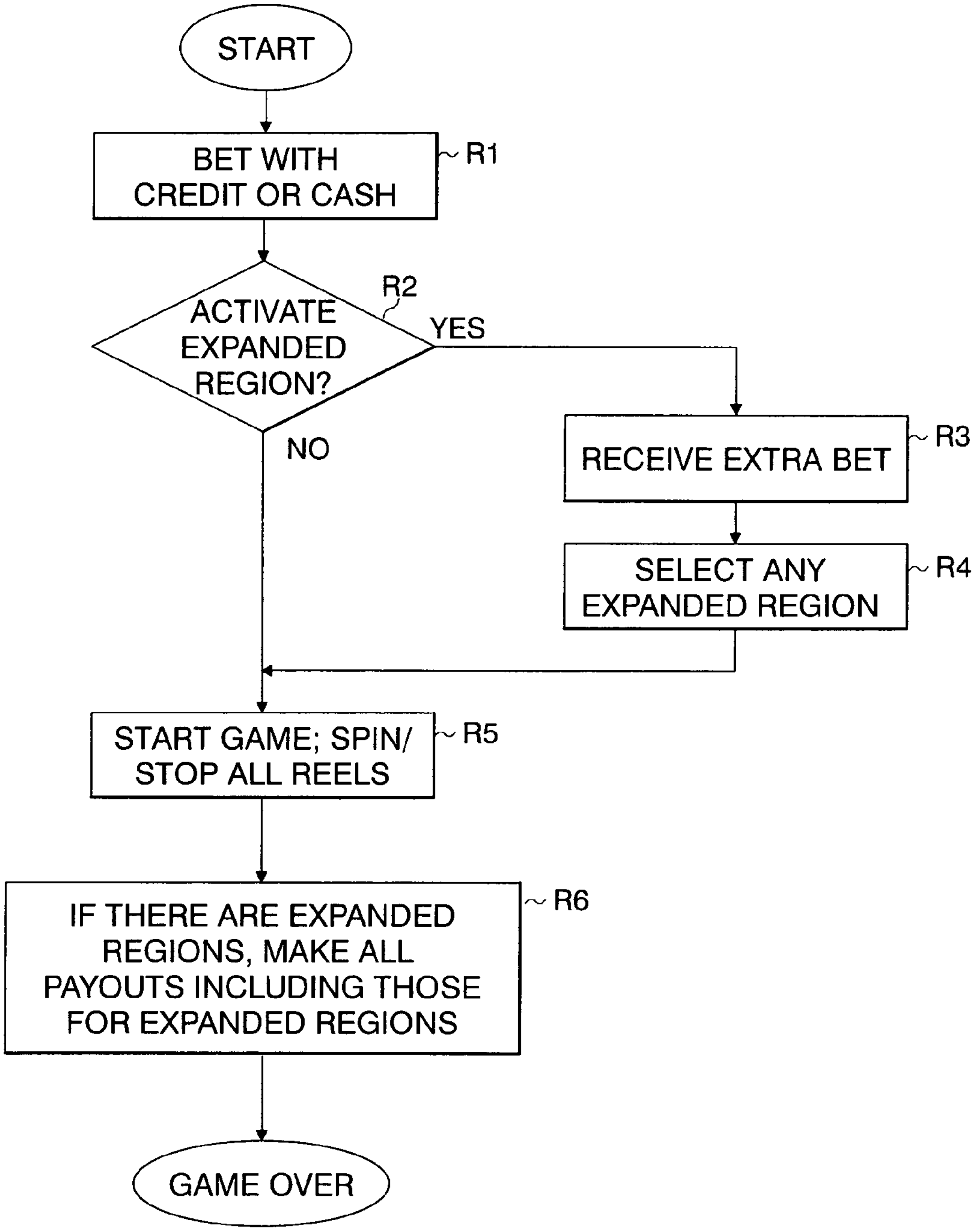
FIG. 8 is a flowchart showing the operations performed by a game machine according to a third embodiment.

FIG. 8 is a flowchart showing the operations performed by a game machine according to the third embodiment. In a normal game standby state, a screen as shown in FIG. 4 is displayed. More specifically, each of the five reels 61-65 is displayed respectively in one of the symbol display regions 7*a* of the image display module 7. The image display module 7 also displays a credit meter showing the number of credits, a BET meter showing the number of BETs, a WIN meter showing the number of medals to be paid out if the player wins, and the like. In the flowchart shown in FIG. 8, the player deposits credit or cash (can be a medal, a coin, or a card) and performs a BET operation (step R1). The player is then queried to determine if an expanded region should be activated or not (i.e., whether or not to expand the symbol display regions) (step R2). This query can be performed with a dialog box on the image display module 7 or the like.

If the expanded region is to be activated at step R2, an extra bet is received (step R3), and the player is made to select an expanded region (step R4). More specifically, the player selects a symbol display region of the reels 61-65 for which the display region is to be expanded by moving the start lever left and right or by doing this in combination with operating other buttons. Selections can be set up so that only one symbol display region of a reel is selectable or all are selectable. It would also be possible to have the number of selectable symbol display regions be determined based on the size of the extra bet.

Next, the game begins and all the reels spin and then stop after predetermined intervals (step R5). When a win is established, a payout associated with the win is paid to the player (step R6). Then, the symbol display regions are expanded as shown in FIG. 5. More specifically, since the symbol display regions 7*b* are 5×5 reels in total, the region to be evaluated becomes larger and winning becomes easier. Thus, win evaluation includes the expanded regions.

In this manner, if the player decides to activate the expanded region and makes an extra bet, the symbol display regions are expanded. As a result, if the player wants to increase the number of displayed symbols, the player can make an extra bet. This makes it possible for the player to freely select when the number of symbols is to be increased. Thus, the game results can reflect the player's judgment and a game having a high degree of participation from the player can be provided.

Fourth Embodiment

In a fourth embodiment, the player makes an "additional bet" after a game in order to make the symbol display regions 7*a* expand to the symbol display regions 7*b*. More specifically, if, after playing a game, the player sees the result and places an additional bet, the player might win because of the expanded display regions. By accepting additional bets after a game, the symbol display regions can be expanded in a manner similar to removing a "blindfold." Other aspects are the same as those from the first embodiment.

Figure 9:
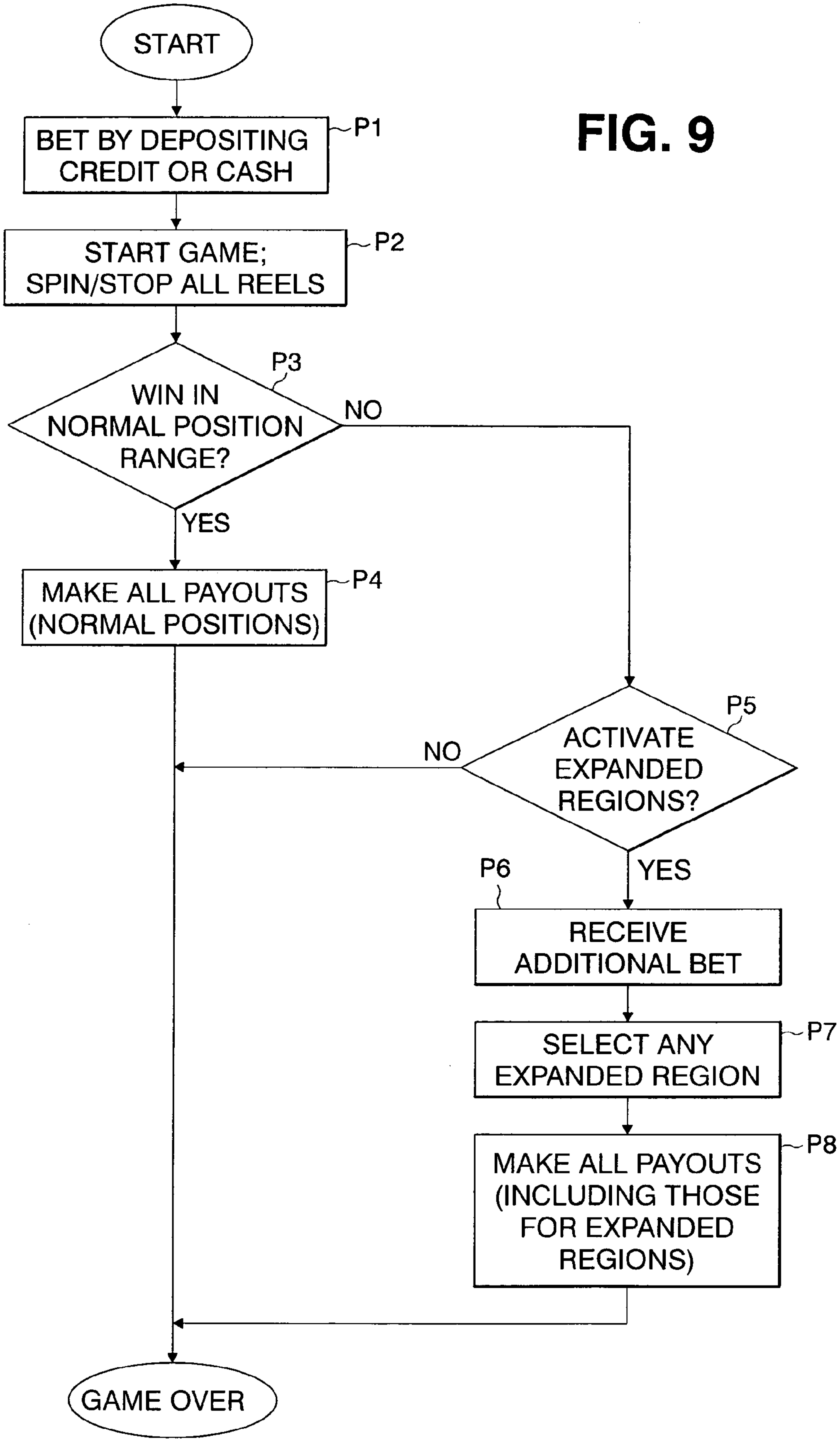
FIG. 9 is a flowchart showing the operations performed by a game machine according to a fourth embodiment.

FIG. 9 is a flowchart illustrating the operations performed by a game machine according to the fourth embodiment. In the normal game standby state, the screen shown in FIG. 4 is displayed. More specifically, the symbol display regions 7*a* of the image display module 7 display five reels 61-65. The image display module 7 also displays a BET meter showing the number of BETs, a WIN meter showing the number of medals to be paid out to the player if there is a win, and the like. In the flowchart shown in FIG. 9, the player deposits credit or cash (can be medals, coins, cards, or the like) and performs a BET operation (step P1) to start the game (step P2). All the reels spin and then stop after predetermined intervals.

Next, the normal position range (the state shown in the symbol display regions 7*a*) is evaluated to determined if there is a win or not (step P3). If there is a win, all payouts are paid to the player (step P4) and the game is ended.

If, at step P3, no win is established in the normal position range, the player is queried to see if the expanded region will be activated (expand the symbol display regions or not) (step P5). This querying can be performed with a dialog box on the image display module 7 or the like. If the expanded region is not to be activated at step P3, the game is ended.

If, at step P3, on the other hand, the expanded region is to be activated, an additional bet is received (step P6), and the player is made to select an expanded region (step P7). More specifically, the player moves the start lever left and right or does this in combination with other button operations to select a symbol display region in the reels 61-65 for which the display region is to be expanded. The selection operation can be set up so that just one reel symbol display region can be selected or some or all can be selected. It is also possible to have the number of selectable reel symbol display regions be determined based on the size of the additional bet. Based on the selection at step P7, the upper end and/or the lower end of the corresponding reel are expanded so that new symbol(s) appear. Then, an evaluation is made to determine if there is a win. At this point, the symbol display regions are expanded to be as shown in FIG. 5. More specifically, the symbol display regions 7*b* are 5×5 reels in total, so the region to be evaluated is larger. This makes it easier to win. Thus, a win evaluation includes the expanded region. If a win is established, all payouts are paid to the player (step P8).

If, after a game, the player decides to activate the expanded region in this manner and places an additional bet, the symbol display regions are expanded. As a result, an additional bet can be placed after the game if the player wants to increase the number of symbols displayed. This makes it possible for the player to freely select when the number of displayed symbols is to be increased. As a result, the game results can reflect the player's judgment, and a game that provides a high degree of player participation can be provided.

Fifth Embodiment

In a game machine according to a fifth embodiment, symbols are displayed in a changing manner and in a static manner using physical reels. These physical reels are housed in a reel unit. For example, three physical reels can be used to form three-column display regions. A cover that can be opened and closed is disposed on each physical reel, and the cover opens and closes according to the status of the game.

Figure 10:
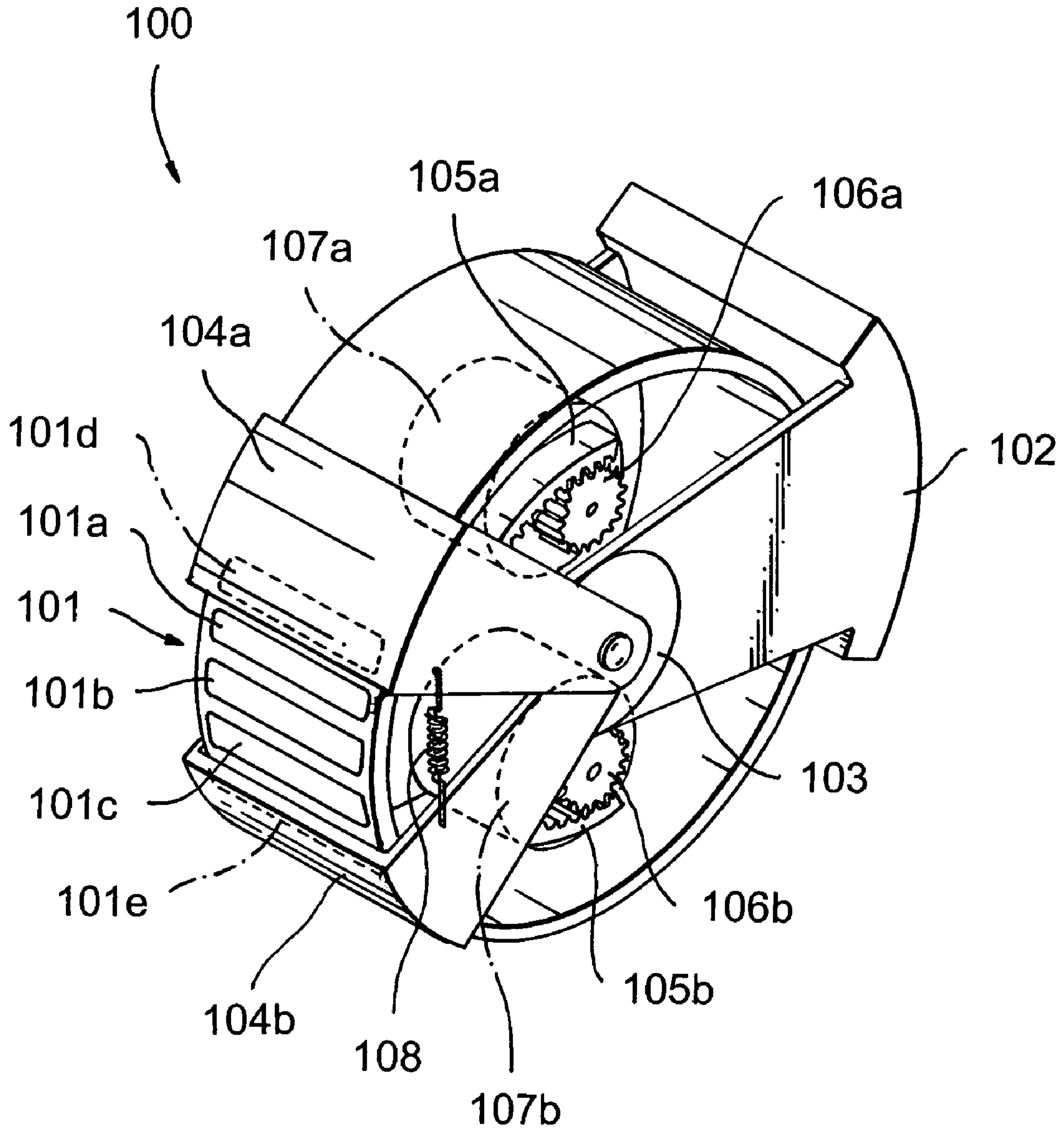
FIG. 10 is a perspective drawing showing a reel module of a game machine according to a fifth embodiment.

FIG. 10 is a perspective drawing showing a reel module from a reel unit in a game machine according to the fifth embodiment. A reel module 100 includes a physical reel 101. The physical reel 101 is rotatably supported by a base 102. The physical reel 101 is rotated by the drive force from a stepping motor 103.

An upper cover 104*a* and a lower cover 104*b*, which can open and close, are disposed on the physical reel 101. The upper cover 104*a* opens and closes by being driven by a rotary solenoid 107*a* by way of a gear 106*a* that meshes with a cover rack 105*a*. Similarly, the lower cover 104*b* opens and closes by being driven by a rotary solenoid 107*b* by way of a gear 106*b* that meshes with the cover rack 105*b*. The opening and closing movements of the upper cover 104*a* and the lower cover 104*b* can be synchronized or can be mutually independent. In the fifth embodiment, the opening and closing movements of the upper cover 104*a* and the lower cover 104*b* are performed in a synchronized manner. A spring 108 is disposed on the upper cover 104*a* and the lower cover 104*b* to provide biasing toward each other.

In FIG. 10, the upper cover 104*a* and the lower cover 104*b* are in a closed state, and the physical reel 101 is able to display the top-, middle-, and bottom-level symbols. More specifically, symbols are displayed in a top-level symbol display position 101*a*, a middle-level symbol display position 101*b*, and a lower-level symbol display position 101*c*. Meanwhile, a symbol display position 101*d* and a symbol display position 101*e* are covered by the upper cover 104*a* and the lower cover 104*b* respectively. Thus, the player is unable to see the symbols at the symbol display position 101*d* and the symbol display position 101*e*, and these symbol display positions are not part of the evaluation performed to determine if there is a win or not.

Figure 11:
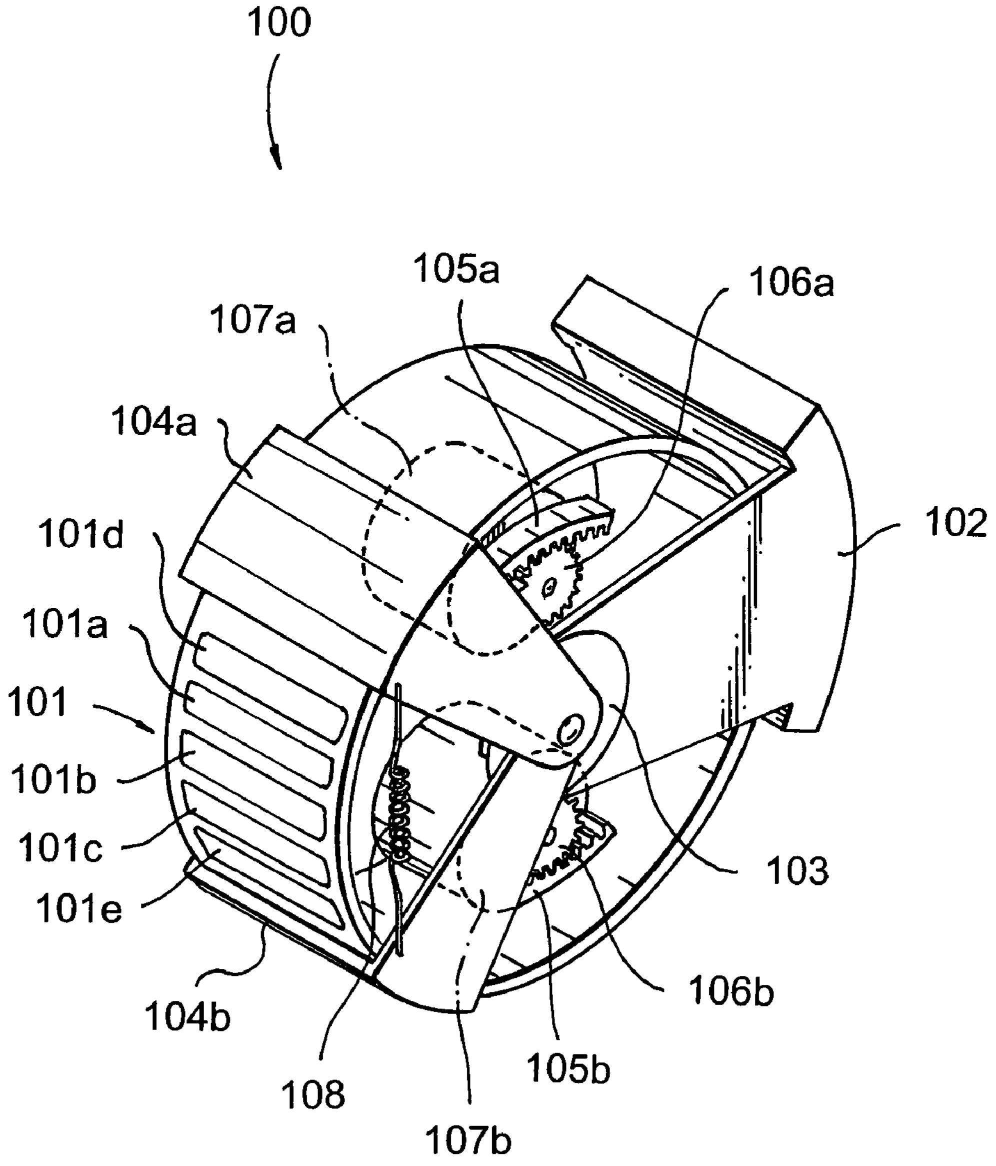
FIG. 11 is a perspective drawing showing a reel module of a game machine according to a fifth embodiment.

FIG. 11 shows the state that will occur when the rotary solenoids 106*a* and 106*b* drive the upper cover 104*a* and the lower cover 104*b* respectively, opening the upper cover 104*a* and the lower cover 104*b*. In this state, the physical reel 101 can display five levels of symbols. More specifically, symbols are displayed at a first symbol display position 101*d*, a second symbol display position 101*a*, a third symbol display position 101*b*, a fourth symbol display position 101*c*, and a fifth symbol display position 101*e*. Thus, the player can see the symbol display position 101*d* and the symbol display position 101*e*, and these symbol display positions are used in the evaluation performed to determine if there is a win. The possibility of a win is increased by increasing the number of symbol display positions to be used in the win evaluation, so the player's anticipation is increased when the upper cover 104*a* and the lower cover 104*b* are opened.

Next, the operations performed by a game machine according to the fifth embodiment presented above will be described. The operations performed by a game machine according to the fifth embodiment can, for example, described using the flowchart shown in FIG. 3. In a normal game, the upper cover 104*a* and the lower cover 104*b* are closed. Then, in FIG. 3, the player performs a BET operation by depositing credit or cash (medals, coins, cards, or the like can be used) (step S1), and a game is started (step S2). When the game starts, the reels, including the physical reel 101, spin and the symbols are displayed in a changing manner. Each reel stops at a predetermined timing when a predetermined interval has elapsed from the start of the spinning. Then, if a win is established, a payout associated with the win is paid to the player (step S3).

Next, if a win is established at step S3, an evaluation is made to determine if the win is a win due to a trigger symbol (step S4). If the win is not due to a trigger symbol, the game is ended. If the win is due to a trigger symbol being statically displayed, the player obtains n free games (step S5). A free game is a game that starts without the player having placed a BET.

When the player obtains n free games, the upper cover 104*a* and the lower cover 104*b* open, resulting in the state shown in FIG. 11 (step S6). As shown in FIG. 11, symbols are displayed at the symbol display positions 101*d* and 101*e* in addition to at the symbol display positions 101*a*-101*c*. As a result, win evaluations are performed for a five-level range.

When a free game is started (step S7), the reels begin spinning from the state shown in FIG. 11 and the symbols are displayed in a changing manner. After a predetermined time has elapsed, all the reels stop. If a predetermined symbol combination lines up on a win line, there is a win, and a corresponding payout is paid to the player (step S8).

Next, in the free game, an evaluation is made to determine if a win due to a trigger symbol is present (step S9). If there is a win due to a trigger symbol, n more free games are added (step S10), and control proceeds to step S7. If there is no trigger symbol win, the number of remaining free games is checked (step S11). If there are remaining free games, control proceeds to step S7. If there are no remaining free games, the free games are ended and the normal game standby state is restored.

With a game machine according to the fifth embodiment as described above, the number of symbols that can be displayed in the display regions is changed if a predetermined trigger symbol is to be statically displayed in one of the display regions as a result of an internal selection. Thus, the change in the number of symbols that can be displayed in the display regions can be easily perceived by the player. More specifically, when a trigger symbol is statically displayed, the upper cover 104*a* and the lower cover 104*b* open to increase the number of symbols that can be displayed in the display regions. This increases the player's anticipation associated with the static display of the trigger symbol. As a result, a game can be provided that provokes the curiosity of the player.

In the present invention, different variations can be used for the setting up of win lines. Examples include: (1) win lines are set up not randomly but so that there are wins in the slot machine; (2) X lines are set up as in (1) when the player places X lines worth of bets ahead of time ahead of time in anticipation of the static display of a special symbol; (3) when a game starts, a separate selection is performed to determine the number of win lines to be set up if a special symbol is statically displayed, with the win lines being arranged in order of payout; (4) if, in addition to a bet for a normal game, a fixed amount is added to the bet to determine the number of win lines set up a separate selection is performed and lines are arranged in order based on payout values; and the like.

The characteristic operations of the present invention described above can be performed by having a computer execute a control program. More specifically, this control program is formed from a series of operations in the form of a set of instructions that can be executed by a computer, with the operations including: an operation for displaying multiple types of symbols in multiple display regions when a game begins; an operation for evaluating whether or not a predetermined condition is met in a game; an operation for changing the number of symbols that can be displayed in the display regions if the condition is met.

Since the number of symbols that can be displayed in the display regions changes when the above condition is met, symbols can be displayed in a manner that was not possible with the conventional technology. As a result, a new game can be implemented that provokes the player's curiosity. For example, in a 3×5 multi-line video slot machine that can display 15 symbols in a changing or static manner, when the above condition is met, the number of symbols that can be displayed goes from 15 to 25, i.e., symbols are displayed in a 5×5 region. As a result, the player can win more easily and the player's anticipation can be greatly increased. It would also be possible, for example, to decrease the number of displayed symbols if conditions are met.

The program described above can be obtained recorded on a recording medium such as CD-ROM, DVD, or the like. This type of program can also be received through signals sent from a computer serving as a transmission device over a transmission medium such as communication network in the form of a public telephone line, a dedicated telephone line, a cable television line, a wireless communication line, or the like. This signal is a computer data signal implemented as a predetermined carrier wave containing a program. During this transmission, only a portion of the program described above needs to be sent, i.e., there is no need for all the data that forms the above program to be present at the same time on the transmission medium. Also, the transmission of the program from the computer described above can be a continuous transmission of the data that forms the program or intermittent transmission.

The game machine of the present invention as described above includes: a display module capable of displaying multiple types of symbols in multiple display regions when a game starts; an evaluation module for evaluating whether or not a predetermined condition is met in the game; and a display control module changing the number of symbols that can be displayed in the display regions.

Since the number of symbols that can be displayed in the display regions is changed when the above condition is met, symbols can be displayed in a manner that could not be done in the conventional technology, and a new game that provokes the player's curiosity can be provided. For example, in a 3×5 multi-line video slot machine that can display 15 symbols in a static or changing manner, when the above condition is met the number of displayed symbols changes from 15 to 25, i.e., symbols are displayed in a 5×5 region. As a result, the player is able to win more easily and the player's anticipation can be greatly increased. It would also be possible, for example, to reduce the number of displayed symbols if a condition is met.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A gaming machine comprising:

at least one input device that receives input from a player for play of a game;

a bet input device that receives a bet for play of the game;

a display device; and a processor configured to operate with the at least one input device, the bet input device, and the display device to:

a) display a plurality of columns where each column has multiple types of symbols which are displayed through a window in a changing manner of a fixed direction in the column, wherein at least one symbol is displayed on each column of symbols in the window to provide at least one row of symbols to display a normal state of the game;

b) evaluate whether at least one row of symbols in the normal state of the game does not result in a winning combination of symbols, wherein if it is determined that no winning combination is achieved, determining if a quantity of symbols displayed through the window needs to be changed based on an optional additional bet input operation by the player to provide a special state of the game;

c) if the additional bet input operation is received from the player, allowing the player to select at least one of the columns to be expanded in which an area of the at least one column will be increased to show additional symbols above and below the column;

d) activate a mechanical cover having an upper cover portion and a lower cover portion to facilitate the expanding of the area of the at least one column by simultaneously opening both the upper and lower portions of the cover to show the additional symbols above and below the column, wherein expanding the one or more columns occurs in the special state of the game, and wherein the multiple types of symbols displayed in the normal state of the game remain in their original positions within each column throughout the special state of the game;

e) evaluate the symbols in the special state of the game including evaluating a combination of symbols displayed in the normal state of the game with additional symbols displayed in the special state of the game to determine if a winning combination has been achieved; and f) award the player a payout based on any winning combinations achieved in the special state of the game.

2. A gaming machine according to claim 1, wherein during said special state of the game said mechanical cover opens to increase the window size to increase the number of symbols displayed on all columns simultaneously through said window.

3. A gaming machine according to claim 2, wherein said special state of the game is free by waiving the optional additional bet, such that the special game is activated without a player having to provide the optional additional bet input.

4. A gaming method comprising the steps of:

a) receiving a betting operation for play of a game at a gaming machine having at least one input device, a bet input device, a display device and a processor;

b) displaying a plurality of columns where each column has multiple types of symbols which are displayed through a window in a changing manner of a fixed direction in the column, wherein at least one symbol is displayed on each column of symbols in the window to provide at least one row of symbols to display a normal state of the game;

c) evaluating whether at least one row of symbols in the normal state of the game does not result in a winning combination of symbols, wherein if it is determined that no winning combination is achieved, determining if a quantity of symbols displayed through the window needs to be changed based on an optional additional bet input operation by the player to provide a special state of the game;

d) if the additional bet input operation is received from the player, allowing the player to select at least one of the columns to be expanded in which an area of the at least one column will be increased to show additional symbols above and below the column;

e) activating a mechanical cover having an upper cover portion and a lower cover portion to facilitate the expanding of the area of the at least one column by simultaneously opening both the upper and lower portions of the cover to show the additional symbols above and below the column, wherein expanding the one or more columns occurs in the special state of the game, and wherein the multiple types of symbols displayed in the normal state of the game remain in their original positions within each column throughout the special state of the game;

f) evaluating the symbols in the special state of the game including evaluating a combination of symbols displayed in the normal state of the game with additional symbols displayed in the special state of the game to determine if a winning combination has been achieved; and g) awarding the player a payout based on any winning combinations achieved in the special state of the game.

5. A gaming method according to claim 4, wherein during said special state of the game said mechanical cover opens to increase the window size to increase the number of symbols displayed on all columns simultaneously through said window.

6. A gaming method according to claim 4, wherein the bet is a MAXBET play.

7. A gaming method according to claim 4, wherein the betting operation is a MAX line play.

8. A gaming method according to claim 4, wherein the payout is an additional bet play.

9. A gaming method according to claim 4, wherein the cover is adapted to uncover less than a full symbol on each column.

* * * * *